(12) United States Patent
Hara et al.

(10) Patent No.: US 11,377,098 B2
(45) Date of Patent: Jul. 5, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Hara, Wako (JP); Yasushi Shoda, Wako (JP); Junpei Noguchi, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/794,293

(22) Filed: Feb. 19, 2020

(65) Prior Publication Data

US 2020/0269834 A1    Aug. 27, 2020

(30) Foreign Application Priority Data

Feb. 26, 2019   (JP) .............................. JP2019-032949

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/20* (2013.01); *B60W 50/10* (2013.01);
(Continued)

(58) Field of Classification Search
CPC .. B60W 30/06; B60W 50/10; B60W 2540/18; B60W 2540/10; B60W 2540/12;
(Continued)

(56) References Cited

U.S. PATENT DOCUMENTS

2017/0123423 A1*  5/2017  Sako ..................... B60N 2/002

FOREIGN PATENT DOCUMENTS

| JP | 2018-097536 | 6/2018 |
|----|-------------|--------|
| JP | 2018-156641 | 10/2018 |
| JP | 2018-157360 | 10/2018 |

OTHER PUBLICATIONS

Japanese Office Action for Japanese Patent Application No. 2019-032949 dated Apr. 5, 2022.

* cited by examiner

*Primary Examiner* — Russell Frejd
*Assistant Examiner* — Ana D Thomas
(74) *Attorney, Agent, or Firm* — Amin, Turocy & Watson, LLP

(57) ABSTRACT

A vehicle control device includes a detector configured to detect a specific operation performed on a vehicle from an outside of the vehicle, a vicinity situation recognizer configured to recognize a vicinity situation of the vehicle, and a driving controller configured to control steering, and acceleration or deceleration of the vehicle on the basis of a vicinity situation recognized, wherein, when the specific operation is detected by the detector before the vehicle arrives at a boarding area in automated exit processing, the driving controller is configured to bring the vehicle into a stopped state, the boarding area being area in which a user of the vehicle is allowed to get on the vehicle, the automated exit processing being process in which the vehicle is caused to exit from a parking lot and allowing the user to get on the vehicle in the boarding area.

16 Claims, 15 Drawing Sheets

(51) Int. Cl.
  *B60W 10/20* (2006.01)
  *B60W 50/10* (2012.01)
(52) U.S. Cl.
  CPC ..... *B60W 2540/10* (2013.01); *B60W 2540/12* (2013.01); *B60W 2540/18* (2013.01)
(58) Field of Classification Search
  CPC ............ B60W 30/18009; B60W 40/02; B62D 15/0285
  See application file for complete search history.

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-032949, filed Feb. 26, 2019, the content of which is incorporated herein by reference.

BACKGROUND

Field

The present invention relates to a vehicle control device, a vehicle control method, and a storage medium.

Description of Related Art

In recent years, research on automatic control of vehicles has advanced. A parking management device which creates, if an exit request signal that requests an exit from parking is received, an exit traveling route from a parking position of a vehicle required to exit to a boarding area and transmits information of the exit traveling route to the vehicle in automated valet parking using this technology has been disclosed (Japanese Unexamined Patent Application, First Publication No. 2018-97536).

SUMMARY

However, the device described above does not consider a case in which a user tries to get on a vehicle in front of a specified area.

The present invention has been made in view of such circumstances, and an object thereof is to provide a vehicle control device, a vehicle control method, and a storage medium which can realize a behavior of a vehicle in accordance with a behavior of a user.

(1): A vehicle control device according to one aspect includes a detector configured to detect a specific operation performed on a vehicle from an outside of the vehicle, a vicinity situation recognizer configured to recognize a vicinity situation of the vehicle, and a driving controller configured to control steering, and acceleration or deceleration of the vehicle on the basis of the vicinity situation recognized by the vicinity situation recognizer, wherein, when the specific operation is detected by the detector before the vehicle arrives at a boarding area in automated exit processing, the driving controller is configured to bring the vehicle into a stopped state, the boarding area being area in which a user of the vehicle is allowed to get on the vehicle, the automated exit processing being process in which the vehicle is caused to exit from a parking lot and allowing the user to get on the vehicle in the boarding area.

(2): In the aspect of (1) described above, when the specific operation is detected by the detector, the driving controller is configured to bring the automated exit processing into the stopped state.

(3): In the aspect of (1) or (2) described above, the specific operation is an operation of opening a door of the vehicle or an operation of unlocking a door lock of the door accompanied by contact of the user to the door of the vehicle.

(4): In the aspect of any one of (1) to (3) described above, even when the vicinity situation recognizer is configured to recognize that the user has performed a gesture to cause the vehicle to stop in an area before arriving at the boarding area, the vehicle is brought into the stopped state.

(5): In the aspect of any one of (1) to (4) described above, the vehicle control device further includes an acquirer configured to acquire a restart signal for causing traveling of the vehicle to restart from a terminal device held by the user, in which the detector detects that the user has got on the vehicle, and the driving controller is configured to cause the traveling of the vehicle to restart when the acquirer acquires the restart signal after the detector does not detect that the user has got on the vehicle any longer in a stopped state of the vehicle.

(6): In the aspect of any one of (1) to (4) described above, a boarding determiner configured to determine whether a driver or a user different from the driver has got on the vehicle is further included, in which the detector detects an open or closed state of a door of the vehicle, and the driving controller is configured to maintain a stopped state of the vehicle even after the detector detects that the door of the vehicle has been closed when the boarding determiner determines that the user different from the driver has got on the vehicle in the stopped state of the vehicle.

(7): In the aspect of any one of (1) to (4) described above, a boarding determiner configured to determine whether a driver has got on the vehicle is further included, in which the detector detects an open or closed state of a door of the vehicle, and the driving controller is configured to cause traveling of the vehicle to restart when the boarding determiner determines that the driver has got on the vehicle and the detector detects that the door of the vehicle is closed.

(8): In the aspect of (6) described above, a first operator that is an accelerator pedal, a steering hole, or a brake pedal, and a controller configured to control the vehicle on the basis of an operation performed on the first operator are further included, in which the controller is configured to not cause the operation performed on the first operator to be reflected in the control of the vehicle after the traveling of the vehicle is restarted.

(9): In the aspect of (7) described above, a first operator that is an accelerator pedal or a steering hole, a second operator that is a brake pedal, and a controller configured to control the vehicle on the basis of the operation performed on the first operator or a second operator are further included, in which the controller is configured to cause the operation performed on the first operator to be reflected in the control of the vehicle after the vehicle has stopped on the basis of the operation performed on the second operator in the boarding area or after the operation is performed on the second operator while the vehicle is stopped in the boarding area.

(10): In the aspect of any one of (1) to (9) described above, the driving controller is configured to bring the automated exit processing into a completed state when the detector detects the specific operation after the vehicle has entered the boarding area in the automated exit processing.

(11): In the aspect of (10) described above, the driving controller is configured to not cause the automated exit processing to restart when a request for the automated exit processing is acquired after the automated exit processing is brought into the completed state, and is configured to cause the automated exit processing to restart when the request for the automated exit processing is acquired after a request for automated entrance processing for causing the vehicle to enter a parking lot after the automated exit processing is brought into the completed state.

(12): A vehicle control method includes, by a computer, detecting a specific operation performed on a vehicle from outside the vehicle, recognizing a vicinity situation of the vehicle, controlling steering and acceleration or deceleration of the vehicle on the basis of the recognized vicinity situation, and bringing the vehicle into a stopped state when the specific operation is detected before the vehicle arrives at a boarding area in automated exit processing, the boarding area being area in which a user of the vehicle is allowed to get on the vehicle, the automated exit processing being process in which the vehicle is caused to exit from a parking lot and allowing the user to get on the vehicle in the boarding area.

(13): A non-transitory computer-readable storage medium that stores a computer program to be executed by a computer to perform at least: detect a specific operation performed on a vehicle from outside the vehicle, recognize a vicinity situation of the vehicle, control steering and acceleration or deceleration of the vehicle on the basis of the recognized vicinity situation, and bring the vehicle into a stopped state when the specific operation is detected before the vehicle arrives at a boarding area in automated exit processing the boarding area being area in which a user of the vehicle is allowed to get on the vehicle, the automated exit processing being process in which the vehicle is caused to exit from a parking lot and allowing the user to get on the vehicle in the boarding area.

According to (1) to (4), (12), and (13), it is possible to realize a behavior of the vehicle in accordance with an action of the user.

According to (5), furthermore, when a restart signal is acquired, traveling of the vehicle is restarted, and thus it is possible to improve convenience for the user.

According to (6), furthermore, when a user different from the driver has got on the vehicle, the stopped state of the vehicle is maintained, and thus the safety in the traveling of the vehicle is further improved. For example, since traveling is not performed when a user different from the driver gets on the vehicle and the driver monitoring the vicinity situation is not present in the vehicle, and thus the safety in the traveling of the vehicle is further improved.

According to (7), furthermore, when the driver has got on the vehicle, the traveling of the vehicle is restarted, and thus it is possible to improve the convenience of the user while improving the safety in the traveling of the vehicle. For example, when the driver who monitors the vicinity situation is present in the vehicle, traveling starts and both safety and convenience are achieved.

According to (8), furthermore, since the operation performed on the first operator is not reflected in the control of the vehicle after the traveling of the vehicle is restarted, it is possible to automatically control the vehicle with a behavior in accordance with the vicinity situation. For example, since the control of the vehicle according to an operation of the driver is suppressed before the automated exit processing ends, a traffic order between a plurality of vehicles in automated exit processing performed by the vehicles is further maintained.

According to (9), furthermore, when the driver is in a state of being capable of controlling the vehicle, the driver can control the vehicle, and thus it is possible to improve the convenience of the driver.

According to (10), when the getting-on/off area has a certain size, the user can easily cause the vehicle to automatically park in the getting-on/off area.

According to (11), when a request for automated exit processing is made after a request for automated entrance processing has been acquired, control is unified to restart the automated exit processing, and thus a processing load of the vehicle control device can be reduced.

DETAILED DESCRIPTION

Hereinafter, embodiments of a vehicle control device, a vehicle control method, and a storage medium will be described with reference to the drawings.

[Overall Configuration]

Figure 1:
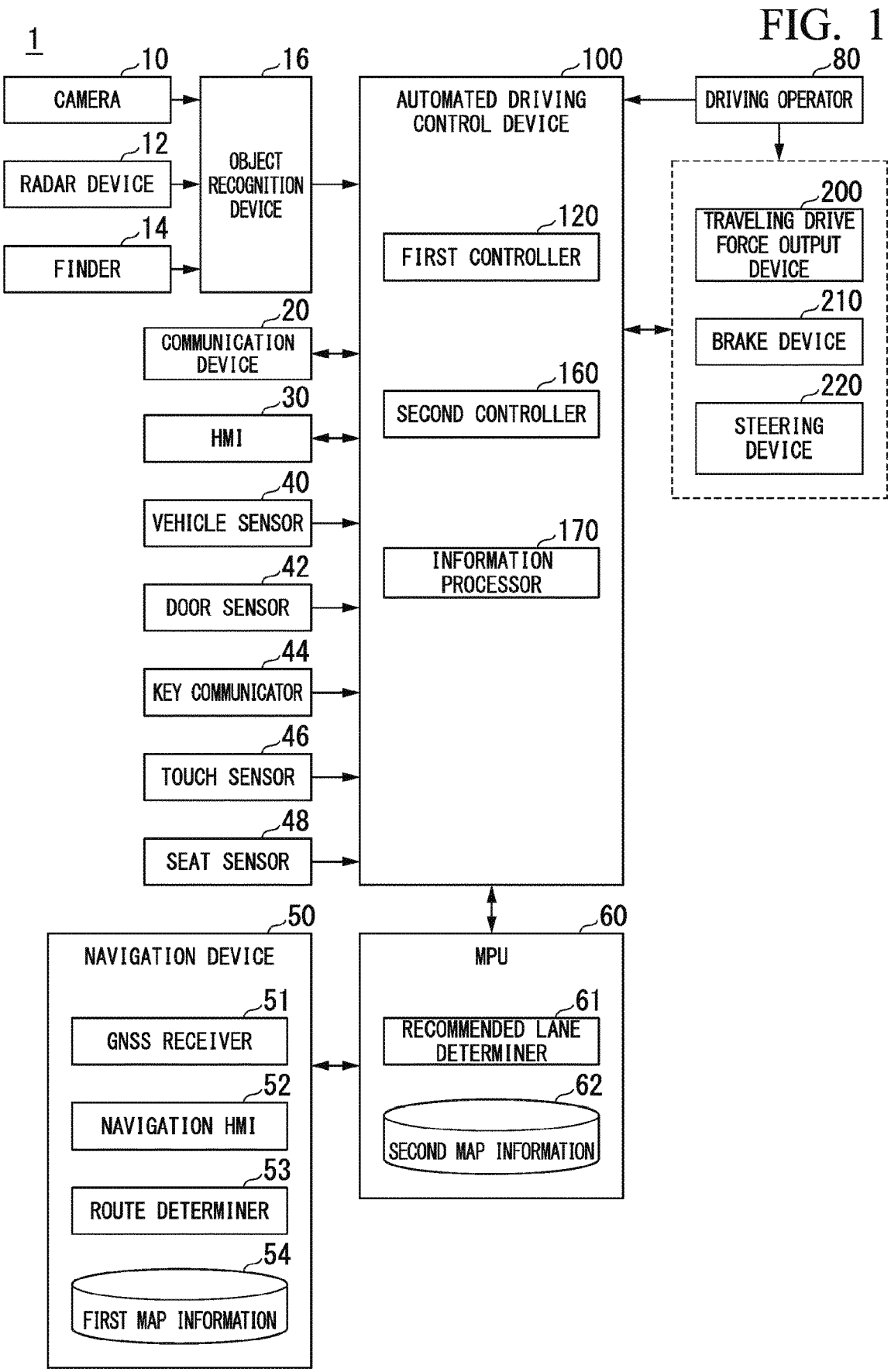
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, two-wheel, three-wheel, or four-wheel vehicle, and a driving source thereof is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a door sensor 42, a key communicator 44, a touch sensor 46, a seat sensor 48, a navigation device 50, a map positioning unit (MPU) 60, a driving operator 80, an automated driving control device 100, a traveling drive force output device 200, a brake device 210, and a steering device 220. These devices or apparatuses are connected to each other by a multiplex communication line such as a controller area network (CAN) communicator line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary position of a vehicle (hereinafter, a host vehicle M) on which the vehicle system 1 is mounted. When the front is imaged, the camera 10 is attached to an upper part of the front windshield, a back of the rearview mirror, or the like. The camera 10 periodically repeats to image a vicinity of the host vehicle M. The camera 10 may also be a stereo camera.

The radar device 12 radiates radio waves such as millimeter waves to the vicinity of the host vehicle M, and detects at least a position (a distance and an orientation) of an object by detecting radio waves (reflected waves) reflected by the object. The radar device 12 is attached to an arbitrary part of the host vehicle M. The radar device 12 may detect the position and a speed of the object using a frequency modulated continuous wave (FM-CW) method.

The finder 14 is a light detection and range (LIDAR). The finder 14 radiates light to the vicinity of the host vehicle M and measures scattered light. The finder 14 detects a distance to the object on the basis of time from light emission and light reception. The radiated light is, for example, pulsed laser light. The finder 14 is attached to an arbitrary part of the host vehicle M.

The object recognition device 16 performs sensor fusion processing on a result of detection performed by some or all of the camera 10, the radar device 12, and the finder 14, and recognizes the position, type, speed, and the like of the object. The object recognition device 16 outputs a result of the recognition to the automated driving control device 100. The object recognition device 16 may output the results of detection by the camera 10, the radar device 12, and the finder 14 to the automated driving control device 100 as they are. The object recognition device 16 may be omitted from the vehicle system 1.

The communication device 20 uses, for example, a cellular network, a Wi-Fi network, a Bluetooth (a registered trademark), a dedicated short range communication (DSRC), or the like, and communicates with another vehicle or a parking lot management device (to be described below) present in the vicinity of the host vehicle M or various types of server devices.

The HMI 30 presents various types of information to a user of the host vehicle M and receives an input operation from the user. The HMI 30 includes various display devices, speakers, buzzers, touch panels, switches, keys, and the like.

The vehicle sensor 40 includes a vehicle speed sensor that detects the speed of the host vehicle M, an acceleration sensor that detects the acceleration, a yaw rate sensor that detects an angular speed around a vertical axis, an orientation sensor that detects a direction of the host vehicle M.

The door sensor 42 detects whether a door of the host vehicle M is open or closed. The door sensor 42 outputs, for example, an ON signal to the automated driving control device 100 when the door is open, and outputs an OFF signal to the automated driving control device 100 when the door is closed. The door sensor 42 may detect which of a plurality of doors of the host vehicle M is open or closed.

The key communicator 44 communicates with a communicator of a terminal device (for example, a portable device or a smart key such as an FOB key) held by the user. For example, the key communicator 44 transmits a request signal at predetermined intervals. When the terminal device is present within a transmission range of the request signal, the terminal device receives the request signal and transmits a response signal to the key communicator 44 in response to the reception.

The touch sensor 46 is provided near a door knob or a door knob outside the host vehicle M. The touch sensor detects, for example, that the door knob or a predetermined position near the door knob is touched by a person such as the user. For example, if a person touches the door knob, the touch sensor 46 detects that the door knob is touched on the basis of a change in capacitance caused by the touch.

The seat sensor 48 is provided, for example, at least in a driver's seat among seats of the vehicle. The seat sensor 48 includes one or more pressure detecting devices, and detects whether the user is sitting on the driver's seat on the basis of a result of detection by the pressure detecting device described above. In the present embodiment, it is assumed that the seat sensor 48 is provided in a passenger seat and a rear seat in addition to the driver's seat.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route (hereinafter, a route on a map) from the position (or an arbitrary input position) of the host vehicle M identified by the GNSS receiver 51 to a destination input from the user using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like. The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the user. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle M travels in a reasonable route for traveling to a branch destination.

The second map information 62 is map information with higher accuracy than the first map information 54. The second map information 62 includes, for example, information on a center of a lane or information on a boundary of the lane. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first controller 120, a second controller 160, and an information processor 170. Each of these functional parts is realized, for example, by a hardware processor such as a central processing unit (CPU) executing a program (software). Some or all of these components may be realized by hardware (a circuit; including circuitry) such as a large scale integration (LSI), an application specific integrated circuit (ASIC), a field-programmable gate array (FPGA), and a graphics processing unit (GPU), and may also be realized by a cooperation of software and hardware. The program may be stored in advance in a storage device (a storage device including a non-transitory storage medium) such as an HDD or a flash memory of the automated driving control device 100, or may be stored in a detachable storage medium such as a DVD or a CD-ROM and installed in the HDD or the flash memory of the automated driving control device 100 by the storage medium (the non-transitory storage medium) being mounted on a drive device.

Figure 2:
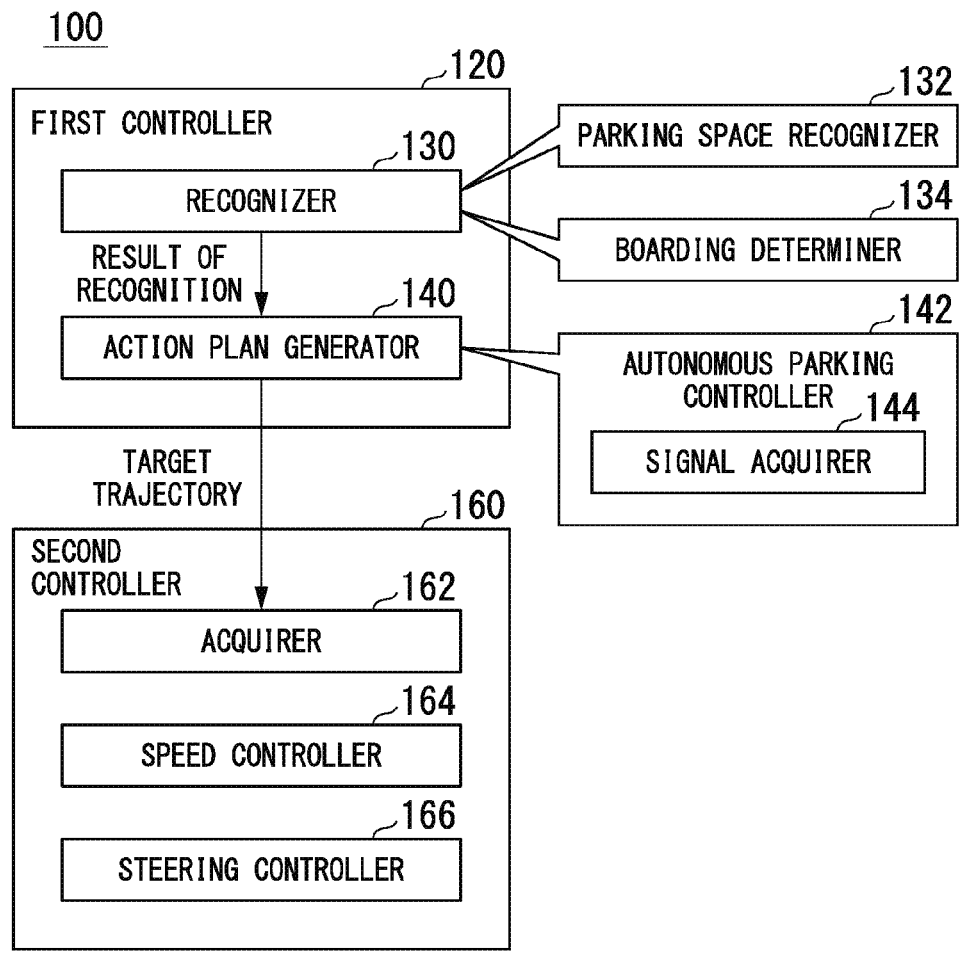
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed. The recognizer 130 is an example of a vicinity situation recognizer."

The recognizer 130 recognizes situations such as the position, speed and acceleration of the object in the vicinity of the host vehicle M on the basis of information input from the camera 10, the radar device 12, and the finder 14 via the object recognition device 16. The position of the object is, for example, recognized as a position on absolute coordinates having the origin at a representative point (a center of gravity, a center of a drive axis, or the like) of the host vehicle M, and is used for control. The position of the object may be represented by a representative point such as a center of gravity or a corner of the object, or may be represented by an expressed area. A "state" of the object may include the acceleration or jerk of the object, or an "action state" (for example, whether a lane is changed or is intended to be changed).

The recognizer 130 recognizes, for example, a lane (traveling lane) in which the host vehicle M is traveling. For example, the recognizer 130 recognizes a traveling lane by comparing a pattern (for example, an array of solid lines and dashed lines) of a road section line obtained from the second map information 62 with a pattern of a road section line in the vicinity of the host vehicle M recognized from an image captured by the camera 10. The recognizer 130 may recognize a traveling lane by recognizing not only a road section line but also a traveling road boundary (road boundary) including road section lines, road shoulders, curbs, median strips, guardrails, and the like. In this recognition, the position of the host vehicle M acquired from the navigation device 50 and a result of processing performed by the INS may be added. The recognizer 130 recognizes temporary stop lines, obstacles, red light, tollgates, or other road events.

When a traveling lane is recognized, the recognizer 130 recognizes the position and posture of the host vehicle M with respect to the traveling lane. The recognizer 130 may recognize, for example, a deviation of a reference point of the host vehicle M from a lane center and an angle formed with respect to a line connecting the lane centers in a traveling direction of the host vehicle M as the relative position and posture of the host vehicle M with respect to the traveling lane. Instead, the recognizer 130 may recognize a position and the like of the reference point of the host vehicle M with respect to either side end (a road section line or a road boundary) of the traveling lane as the relative position of the host vehicle M with respect to the traveling lane.

The recognizer 130 includes, for example, a parking space recognizer 132 and a boarding determiner 134 to be described below, which are started in an autonomous parking event. Details of functions of the parking space recognizer 132 will be described below.

The boarding determiner 134 determines whether the user is sitting on a driver's seat on the basis of a result of detection by the seat sensor 48. The boarding determiner 134 determines whether the user is sitting on a seat other than the driver's seat on the basis of a result of the detection by the seat sensor 48. When the user is sitting on the driver's seat or other seats, it means that the user is in the host vehicle M. When the user is sitting on the driver's seat, it means the driver is in the host vehicle M, and, when the user is not sitting on the driver's seat, it means that the driver is not in the host vehicle M.

In principle, the action plan generator 140 travels on a recommended lane determined by the recommended lane determiner 61, and furthermore, generates a target trajectory in which the host vehicle M will automatically (without depending on an operation of the driver) travel to be able to cope with the vicinity situation of the host vehicle M. The target trajectory includes, for example, a speed element. For example, the target trajectory is expressed as a sequence of points (orbit points) to be reached by the host vehicle M. The orbit points are points to be reached by the host vehicle M for each predetermined traveling distance (for example, about several [m]) in a road distance, and separately from this, a target speed and a target acceleration for each predetermined sampling time (for example, about 0 commas [sec]) are generated as a part of the target trajectory. The orbit points may be positions to be reached by the host vehicle M at corresponding sampling times for each corresponding sampling time. In this case, the information on the target speed and the target acceleration is expressed by an interval between the orbit points.

The action plan generator 140 may set an automated driving event in generation of a target trajectory. Examples of the automated driving event include a constant-speed traveling event, a low-speed following traveling event, a lane change event, a branching event, a merging event, a takeover event, an autonomous parking event in which unmanned traveling and parking are performed in valet parking and the like. The action plan generator 140 generates a target trajectory in accordance with a started event. The action plan generator 140 includes an autonomous parking controller 142 which is started when an autonomous parking event is executed. Details of functions of the autonomous parking controller 142 will be described below.

The second controller 160 controls the traveling drive force output device 200, the brake device 210, and the steering device 220 such that the host vehicle M passes through the target trajectory generated by the action plan generator 140 at a scheduled time.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores it in a memory (not shown). The speed controller 164 controls the traveling drive force output device 200 or the brake device 210 on the basis of a speed element associated with the target trajectory stored in the memory. The steering controller 166 controls the steering device 220 in accordance with a bending of the target trajectory stored in the memory. Processing of the speed controller 164 and the steering controller 166 is realized by, for example, a combination of feed forward control and feedback control. As an example, the steering controller 166 executes a combination of the feed forward control in accordance with curvature of a road in front of the host vehicle M and the feedback control based on a deviation from the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an electronic control unit (ECU) that controls these. The ECU controls the constituents described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the driving operator 80 such that a brake torque associated with a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second controller 160 or the information input from the driving operator 80.

[Autonomous Parking Event-at the Time of Entrance]

Figure 3:
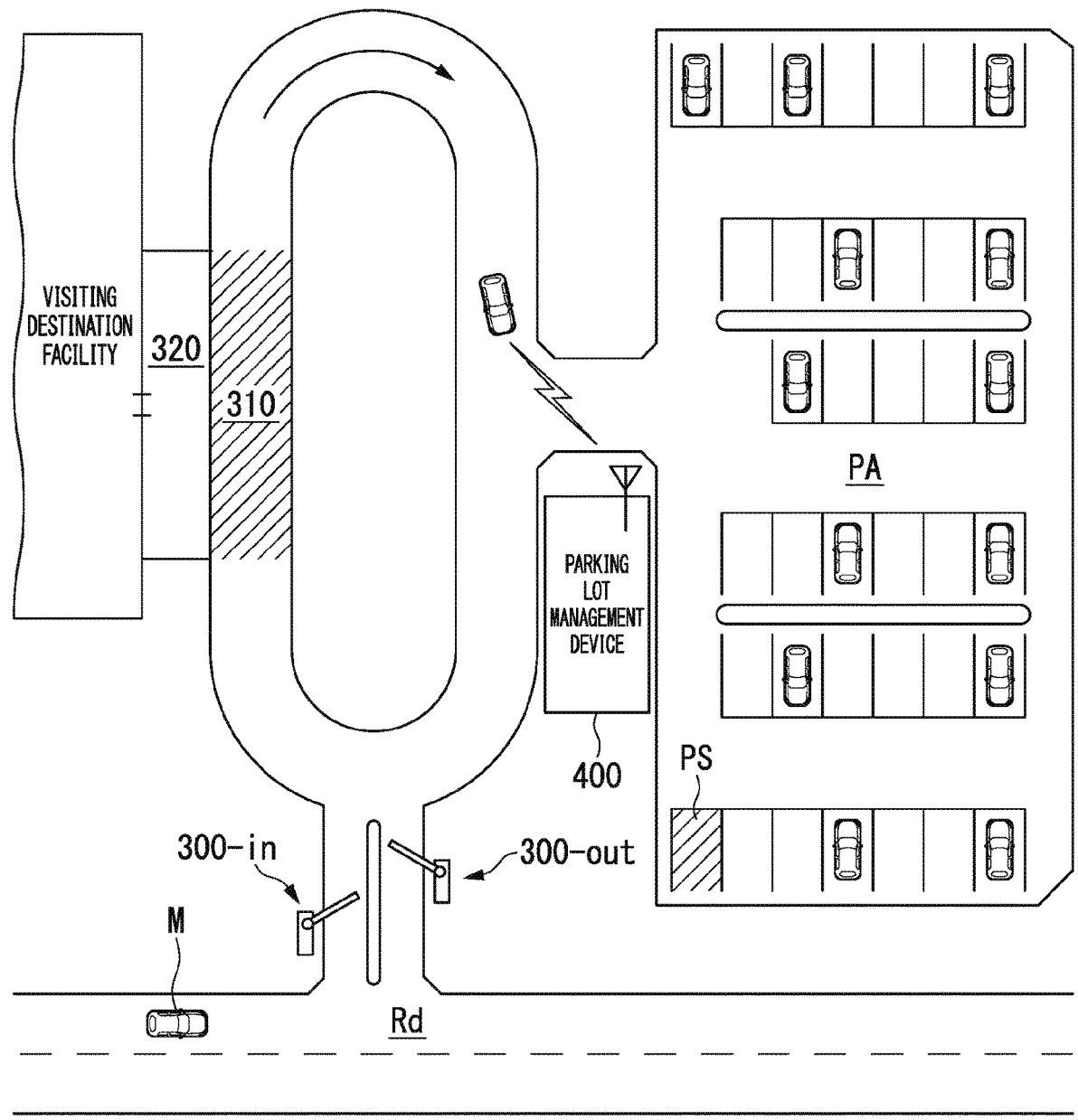
FIG. 3 is a diagram which schematically shows a scene in which an autonomous parking event is executed.

The autonomous parking controller 142 causes the host vehicle M to park in a parking space on the basis of, for example, information acquired from the parking lot management device 400 by the communication device 20. FIG. 3 is a diagram which schematically shows a scene in which an autonomous parking event is executed. In a route from a road Rd to a visiting destination facility, gates 300-in and 300-out are provided. The host vehicle M proceeds to the stop area 310 by passing through the gate 300-in by manual driving or automated driving. The stop area 310 faces a getting-on/off area 320 connected to the visiting destination facility. The getting-on/off area 320 is provided with an eave for avoiding rain and snow. The stop area 310 is an example of the "boarding area."

The host vehicle M starts an autonomous parking event in which unmanned (or manned) automated driving and moving to a parking space PS in the parking lot PA are performed after the user is dropped at the stop area 310. A start trigger of the autonomous parking event may be, for example, certain operations performed by the user, or may be a reception of a predetermined signal wirelessly from the parking lot management device 400. The autonomous parking controller 142 controls the communication device 20 such that it transmits a parking request to the parking lot management device 400 when the autonomous parking event is started. Then, the host vehicle M moves from the stop area 310 to the parking lot PA according to a guidance of the parking lot management device 400 or while performing sensing by itself.

Figure 4:
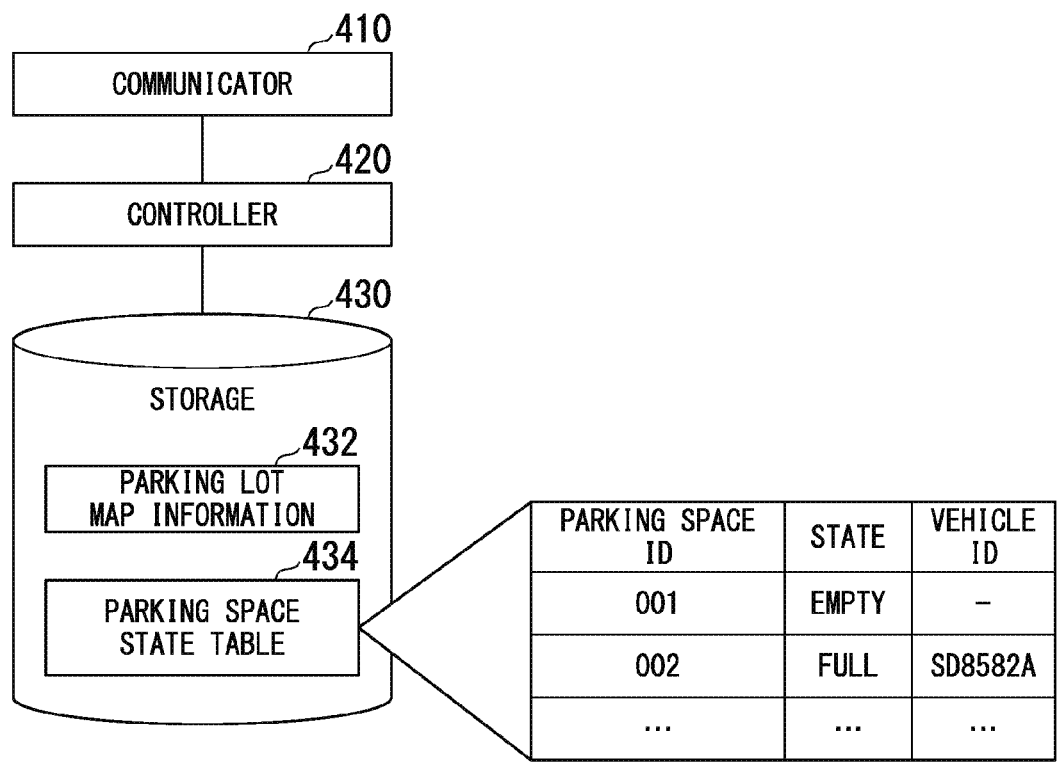
FIG. 4 is a diagram which shows an example of a configuration of a parking lot management device.

FIG. 4 is a diagram which shows an example of a configuration of the parking lot management device 400. The parking lot management device 400 includes, for example, a communicator 410, a controller 420, and a storage 430. The storage 430 stores parking lot map information 432 and information on a parking space state table 434 and the like.

The communicator 410 wirelessly communicates with the host vehicle M and other vehicles. The controller 420 guides a vehicle to the parking space PS on the basis of information acquired by the communicator 410 and information stored in the storage 430. The parking lot map information 432 is information in which a structure of the parking lot PA is geometrically represented. The parking lot map information 432 includes coordinates for each parking space PS. The parking space state table 434 is a table in which, for example, information indicating an empty state or information indicating a full (parking) state is associated with a parking space ID that is identification information of the parking space PS. When a parking space is in the full state, a vehicle ID that is identification information of a parking vehicle is associated with the parking space ID.

If the communicator 410 receives a parking request from a vehicle, the controller 420 extracts a parking space PS which is in the empty state with reference to the parking space state table 434, acquires a position of the extracted parking space PS from the parking lot map information 432, and transmits a preferred route to the position of the acquired parking space PS to the vehicle using the communicator 410. The controller 420 instructs a specific vehicle to stop or slow down when necessary on the basis of a positional relationship of a plurality of vehicles such that vehicles do not proceed to the same position at the same time.

In the vehicle that has received the route (hereinafter, referred to as the host vehicle M), the autonomous parking controller 142 generates a target trajectory based on the route. If a target parking space PS is approached, the parking space recognizer 132 recognizes a parking frame line or the like that partitions off the parking space PS, and recognizes a detailed position of the parking space PS to provide it to the autonomous parking controller 142. The autonomous parking controller 142 corrects the target trajectory after receiving this and causes the host vehicle M to park in the parking space PS.

[Autonomous Parking Event-at the Time of Exit]

The autonomous parking controller 142 and the communication device 20 maintain an operating state even while the host vehicle M parks. The autonomous parking controller 142 causes a system of the host vehicle M to start and causes the host vehicle M to move to the stop area 310, for example, when the communication device 20 receives a pick-up request from a terminal device of the user. In the following description, this processing may be referred to as "automated exit processing." At this time, the autonomous parking controller 142 controls the communication device 20 such that it transmits a departure request to the parking lot management device 400. The controller 420 of the parking lot management device 400 instructs a specific vehicle to stop or slow down when necessary on the basis of the positional relationship of a plurality of vehicles such that the vehicles do not proceed to the same position at the same time. If the host vehicle M is moved to the stop area 310 to allow the user to board, the autonomous parking controller 142 stops operating, and thereafter, manual driving or automated driving performed by another functional part is started.

The autonomous parking controller 142 is not limited to the description above, and may find a parking space in the empty state by itself on the basis of a result of detection performed by the camera 10, the radar device 12, the finder 14, or the object recognition device 16 independently of communication, and cause the host vehicle M to park in the found parking space.

The autonomous parking controller 142 includes, for example, a signal acquirer 144. The signal acquirer 144 acquires a restart signal from the terminal device held by the user after the autonomous parking event at the time of an exit is brought into the stopped state. The restart signal is signal in which for causing the autonomous parking event at the time of an exit in the stopped state to restart. The details will be described below. In the following description, the autonomous parking event at the time of an exit may be referred to as "automated exit processing" in some cases.

When a specific operation is performed on the host vehicle M from outside the host vehicle M, the information processor 170 detects that the specific operation has been performed. The specific operation is an operation of opening the door of the host vehicle M or an operation of unlocking the door lock of the door accompanied by contact of the user with the door of the host vehicle M. A combination of the information processor 170 and the door sensor 42 or a combination of the information processor 170, the key communicator 44, and the touch sensor 46 is an example of the "detector."

The information processor 170 acquires a result of detection performed by the door sensor 42, and determines whether the door of the host vehicle M is open or closed on the basis of the acquired result of detection. That is, when it is determined that the door of the host vehicle M is open, the information processor 170 determines that a specific operation has been performed.

The information processor 170 acquires a result of detection performed by the touch sensor 46, and determines whether a person has touched the door knob or a predetermined position near the door knob of the host vehicle M on the basis of the acquired result of detection. The information processor 170 acquires a result of detection performed by the seat sensor 48, and determines whether the user is sitting on the driver's seat, the passenger seat, or the rear seat on the basis of the result of detection.

The information processor 170 acquires identification information of the terminal device acquired by the key communicator 44 communicating with the terminal device. The information processor 170 determines whether the identification information acquired by the key communicator 44 coincides with identification information stored in the storage device (not shown). The information processor 170 performs control such that the door lock is changed from a locked state to an unlocked state when it is determined that the two pieces of identification information described above coincide with each other and a person touches the door knob. An operation of the user changing to this unlocked state is an example of the "specific operation." For example, the information processor 170 transmits an instruction signal to a lock controller (not shown) that controls the door lock so as to set the door lock to be open. The lock controller performs control such that the door lock is set from the locked state to the unlocked state when the instruction signal described above is acquired.

[Processing of Stopping Automated Exit Processing]

Figure 5:
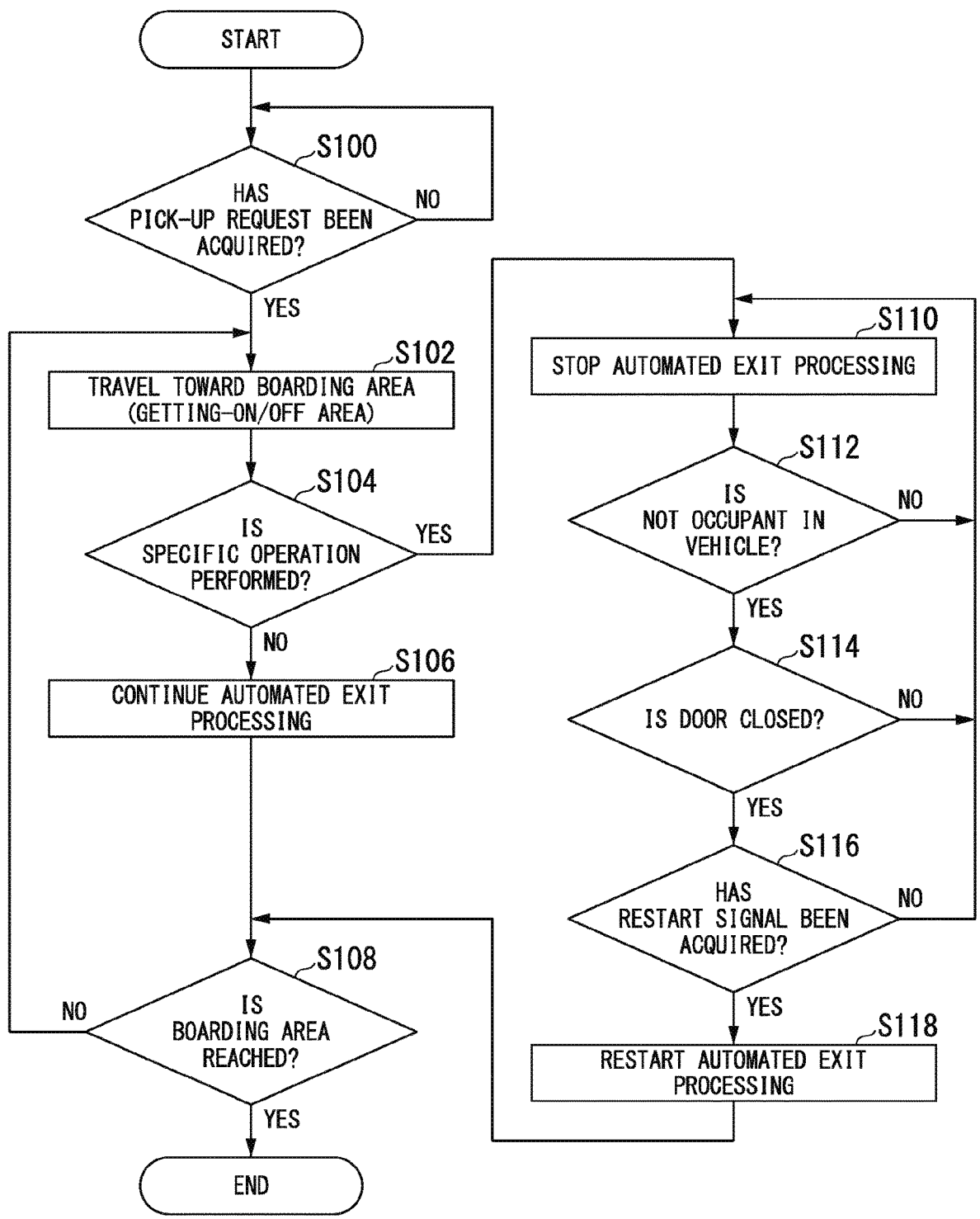
FIG. 5 is a flowchart which shows an example of a flow of processing executed by an automated driving control device.

FIG. 5 is a flowchart which shows an example of a flow of processing executed by the automated driving control device 100. The present processing is processing executed when the host vehicle M parks in the parking lot PA.

First, the autonomous parking controller 142 determines whether a pick-up request has been acquired (step S100). When a pick-up request has been acquired, the autonomous parking controller 142 starts traveling towards the getting-on/off area 320 from the parking lot PA (step S102). That is, the automated exit processing is started.

Next, the information processor 170 determines whether the specific operation has been performed (step S104). When it is determined that the specific operation has not been performed, the autonomous parking controller 142 continues the automated exit processing (step S106). Next, the autonomous parking controller 142 determines whether the host vehicle M has reached the getting-on/off area 320 (the stop area 310) (step S108). When it has not reached the getting-on/off area 320, the procedure returns to the processing of step S102. When it has reached the getting-on/off area 320, processing of one routine of the present flowchart ends.

When it is determined that the specific operation has been performed, the autonomous parking controller 142 stops the automated exit processing (step S110). As a result, the host vehicle M stops traveling of the host vehicle M before arriving at the getting-on/off area 320. When the specific operation has been performed, the autonomous parking controller 142 may cause the host vehicle M to slow down and then stop. The information processor 170 determines whether the user is not in the host vehicle M (step S112). When it is determined that the user is not in the host vehicle M, the information processor 170 determines whether the door of the host vehicle M is closed (step S114).

When the door of the host vehicle M is closed (for example, when all the doors of the host vehicle M are closed), the autonomous parking controller 142 determines whether a restart signal has been acquired (step S116). When the restart signal has been acquired, the autonomous parking controller 142 causes the stopped automated exit processing to restart (step S118), and proceeds to the processing of step S108. That is, the autonomous parking controller 142 causes the automated exit processing to restart when the restart signal is acquired after it is no longer detected that the user has got on the host vehicle M in a stopped state of the automated exit processing. If the automated exit processing is restarted, for example, the autonomous parking controller 142 causes a traveling of the host vehicle M to restart. When a negative determination result is obtained in the processing of steps S112, S114, and S116, the procedure returns to the processing of step S110. As a result, processing of one routine of the present flowchart ends.

Some of the processing of the present flowchart may be omitted, or an order of each piece of processing may be changed. When the recognizer 130 has recognized that the user has performed a gesture to stop the host vehicle M in an area (an area different from the stop area 310) before arriving at the getting-on/off area 320, the automated exit processing (the traveling of the vehicle) is set to be in the stopped state. For example, "processing of determining whether the user has performed a gesture to stop the host vehicle M in the area before arriving at the getting-on/off area 320" may be performed instead of "processing of determining whether the specific operation has been performed" in the processing of step S104.

Figure 6:
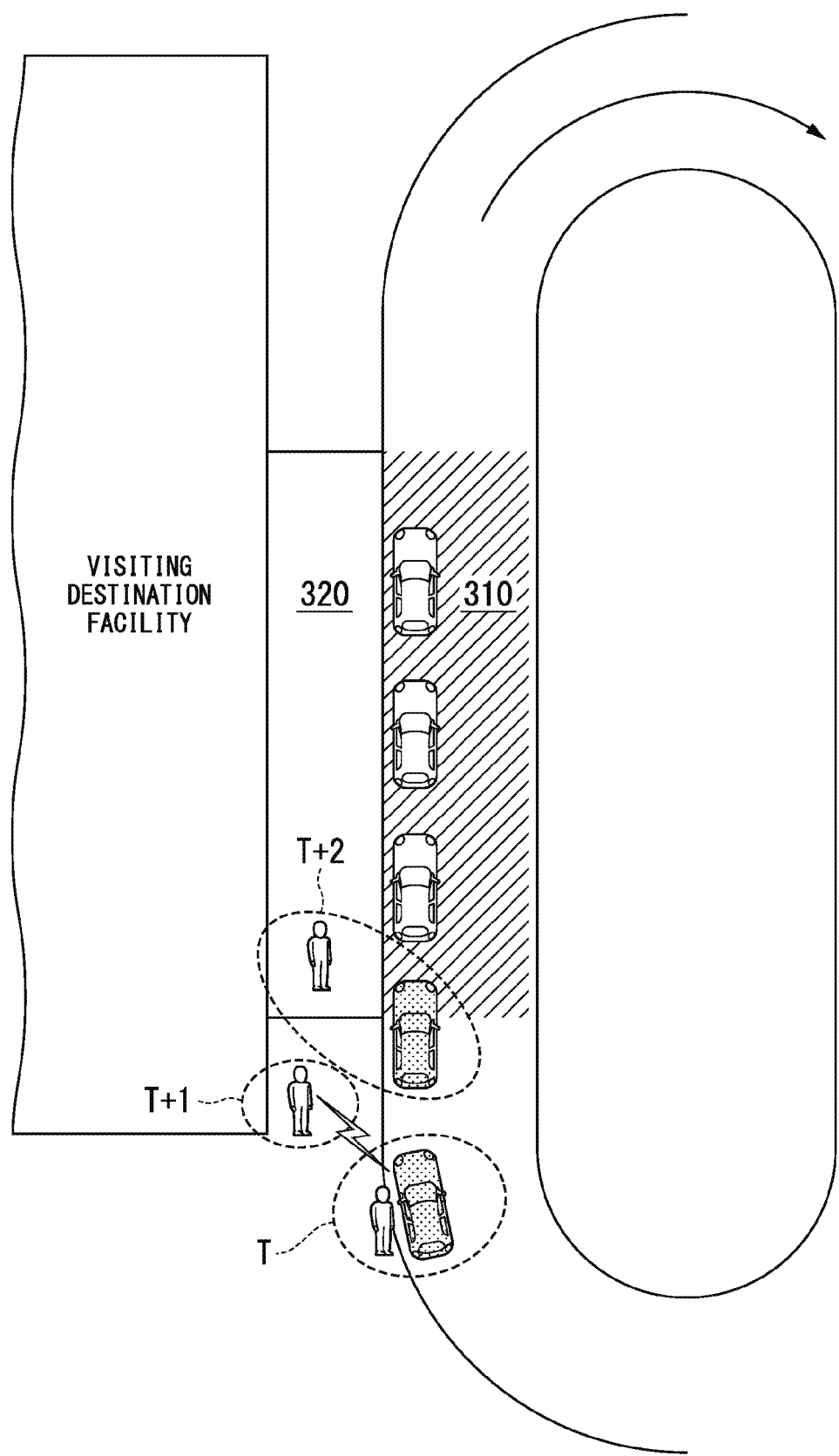
FIG. 6 is a diagram which shows an example of a scene in which automated exit processing is restarted.

FIG. 6 is a diagram which shows an example of a scene in which the automated exit processing is restarted. For example, when the user has performed a specific operation, the automated exit processing is in the stopped state at a time T. The user stops the specific operation and transmits a restart signal to the automated driving control device 100 using the holding terminal device at a time T+1. At a time T+2, the automated driving control device 100, if the restart signal is acquired, causes the automated exit processing to restart and starts traveling toward the getting-on/off area 320. As a result, the user can get on the host vehicle M in the getting-on/off area 320.

Here, as shown in FIG. 6, when another vehicle is stopped at the stop area 310 of the getting-on/off area 320 and the stop area 310 is congested, the user waiting in the getting-on/off area 320 may approach the host vehicle M before reaching the getting-on/off area 320 and perform the specific operation. In a vehicle of a comparative example, control of a case in which the specific operation described above is performed has not been considered. For this reason, the vehicle of the comparative example cannot realize a behavior in accordance with the action of the user.

On the other hand, the automated driving control device 100 of the present embodiment can restart the automated exit processing when the specific operation has been performed and the user has acquired a restart signal while the user is not in the host vehicle M. As described above, the automated driving control device 100 can realize the behavior of the vehicle in accordance with the action of the user.

Figure 7:
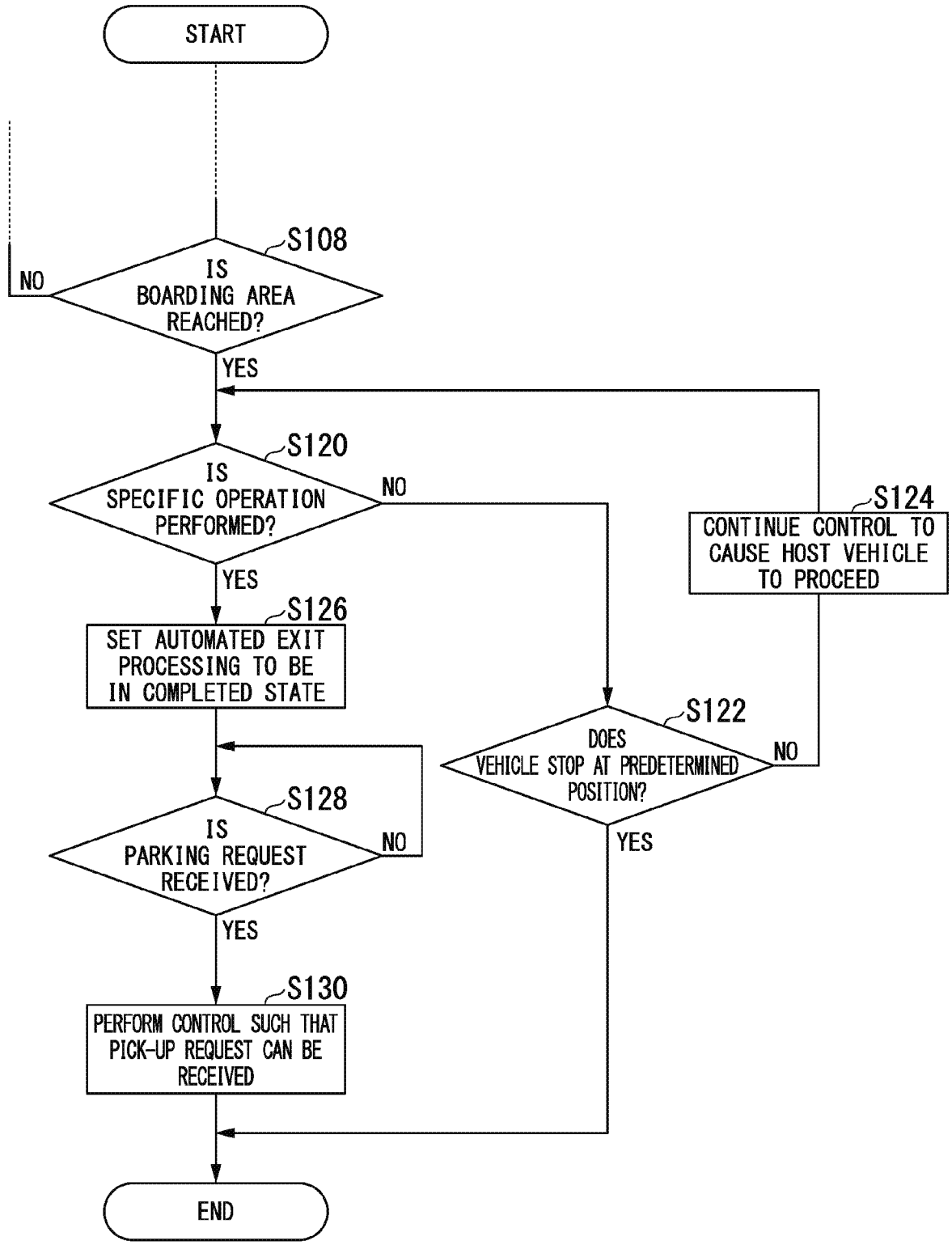
FIG. 7 is a flowchart which shows another example of a flow of processing executed by the automated driving control device.

In the example of FIG. 5 described above, when the host vehicle M has reached the getting-on/off area 320, it is described that the processing ends, but, when the host vehicle M has arrived at the getting-on/off area 320 (has entered the getting-on/off area 320), the processing of the flowchart shown in FIG. 7 may be performed.

FIG. 7 is a flowchart which shows another example of a flow of processing executed by the automated driving control device 100. Since processing of step S100 to step S118 in FIG. 7 is the same as the processing with the same step numbers in FIG. 5, these types of processing will not be listed in FIG. 7 and descriptions thereof will be omitted.

In FIG. 7, the automated driving control device 100 sets the automated exit processing to be in a completed state when the specific operation is detected after the host vehicle M has entered the stop area 310, and does not cause the automated exit processing to restart when a request for the automated exit processing is acquired after the automated exit processing is in the completed state, but causes the automated exit processing to restart when the request for the automated exit processing is acquired after a request for automated entrance processing for causing the vehicle to enter a parking lot in an unmanned manner is acquired after the automated exit processing is in the completed state.

When the vehicle has reached the getting-on/off area 320, the information processor 170 determines whether the specific operation has been performed (step S120). When the specific operation has not been performed, the information processor 170 determines whether the host vehicle M has stopped at a predetermined position (step S122). The predetermined position is a predetermined position in the stop area 310, and is a position at which the automated driving control device 100 has determined to pick up the user on the basis of the vicinity situation. When the host vehicle M stops at the predetermined position, processing of one routine of the present flowchart ends. When the host vehicle M does not stop at the predetermined position, the automated driving control device 100 continues control to cause the host vehicle M to proceed toward the predetermined position (step S124), and returns to the processing of step S120.

When the specific operation is performed in step S120 (for example, when the specific operation is performed before the vehicle stops at the predetermined position), the host vehicle M stops, and furthermore the information processor 170 sets the automated exit processing to be in the completed state (step S126). For example, when the specific operation is performed, the information processor 170 writes an automated exit completion flag indicating that the automated exit processing has been completed in the storage device. As a result, even if the host vehicle M receives the pick-up request (the request for the automated exit processing), the host vehicle M does not execute the automated exit processing.

Next, the information processor 170 determines whether a parking request (a request for automated entrance processing) has been received (step S128). When the parking request is received, the information processor 170 controls the host vehicle M such that the host vehicle can receive the pick-up request (step S130). For example, the information processor 170 deletes the written automated exit completion flag and controls the host vehicle M such that the host vehicle can receive the pick-up request. The information processor 170 does not perform the automated exit processing when the pick-up request is acquired while it cannot receive the pick-up request, and performs the automated exit processing when the pick-up request is acquired while it can receive the pick-up request.

For example, it is assumed that the automated exit processing is completed by the specific operation and the vehicle has parked in the stop area 310. In this state, if the user transmits a parking request to the host vehicle M and transmits a pick-up request to the host vehicle M after having completed his requirement, the host vehicle M automatically moves near the user and picks-up the user.

According to the processing described above, when the stop area 310 has a certain size, the user can easily cause the host vehicle M to perform autonomous parking in the stop area 310. When a pick-up request is made after a parking request is acquired, control is unified to restart the automated exit processing, and thus a processing load of the vehicle system 1 is reduced.

According to the first embodiment described above, the automated driving control device 100 sets the automated exit processing to be in the stopped state when the specific operation is detected by the information processor 170 before the host vehicle M arrives at the getting-on/off area in the automated exit processing for causing the host vehicle M to exit from the parking lot in the unmanned manner and allowing the user to get on the vehicle in the getting-on/off area where the user of the host vehicle M is allowed to get on. As a result, it is possible to realize the behavior of the vehicle in accordance with the action of the user.

According to the first embodiment described above, the automated driving control device 100 causes the automated exit processing to restart when a restart signal is acquired by the autonomous parking controller 142 in a case in which the information processor 170 does not detect that the user has got on the host vehicle M while the automated exit processing is in the stopped state. As a result, the vehicle starts traveling toward the getting-on/off area 320, and reaches the getting-on/off area 320. Then, the user can get on the host vehicle M. As described above, the automated driving control device 100 can realize the behavior f of the vehicle in accordance with the action of the user.

Second Embodiment

Hereinafter, a second embodiment will be described. In the first embodiment, when the specific operation is performed, the automated driving control device 100 has caused the automated exit processing to restart when a restart signal is acquired while the user is not in the host vehicle M. In the second embodiment, the automated driving control device 100 restarts the automated exit processing when the driver has got on the vehicle. In the following description, a difference from the first embodiment will be mainly described.

[Processing of Stopping Automated Exit Processing]

Figure 8:
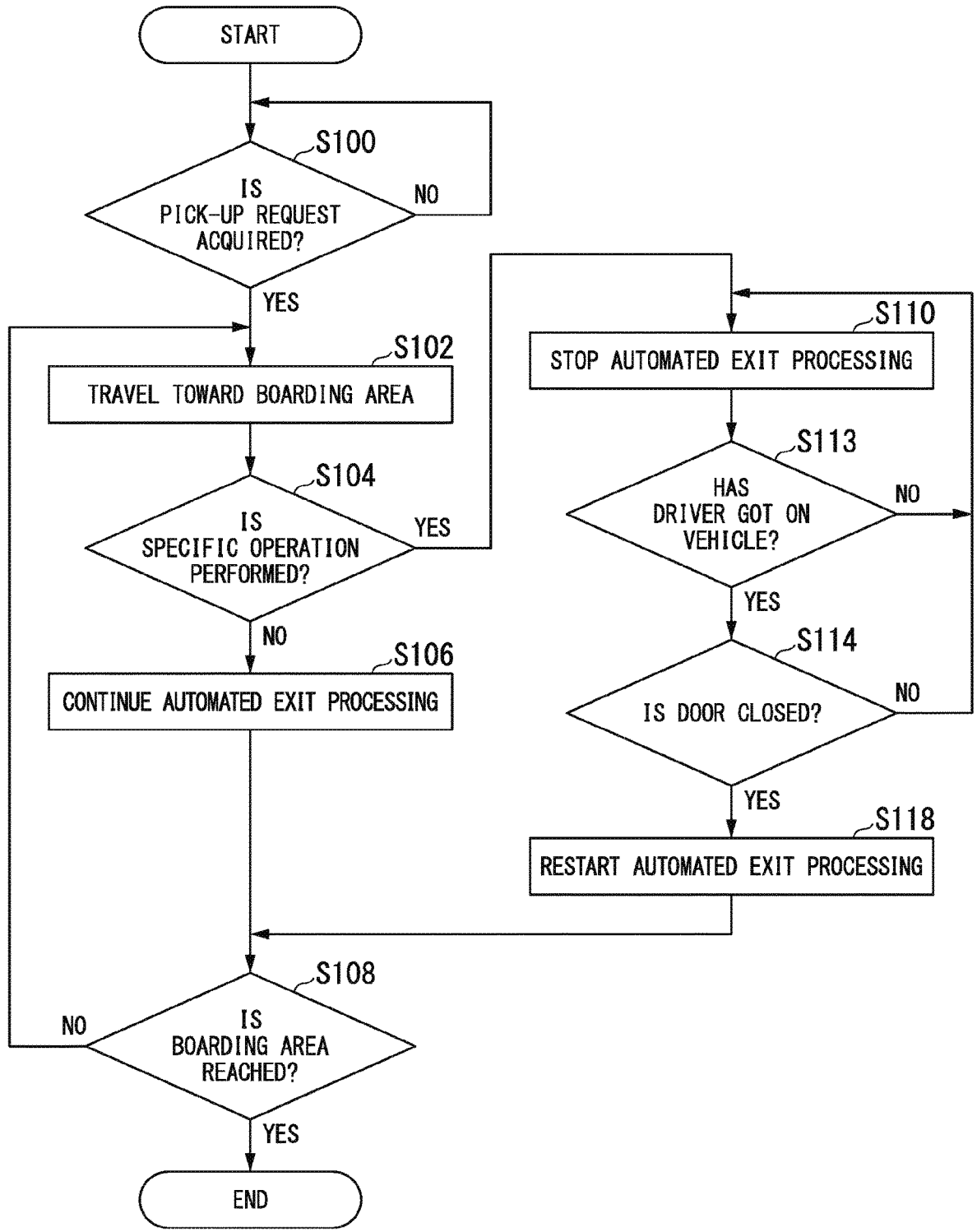
FIG. 8 is a flowchart which shows an example of a flow of processing executed by an automated driving control device of a second embodiment.

FIG. 8 is a flowchart which shows an example of a flow of processing executed by the automated driving control device 100 of the second embodiment. A difference from the flowchart of FIG. 5 will be mainly described. In the flowchart of FIG. 7, the processing of step S113 is performed instead of the processing of step S112 in the flowchart of FIG. 5. In the flowchart of FIG. 8, the processing of step S116 in the flowchart of FIG. 5 will be omitted.

When it is determined that the specific operation has been performed in step S104, the autonomous parking controller 142 stops the automated exit processing (step S110). Next, the information processor 170 determines whether the driver has got on the host vehicle M (step S113). When it is determined that the driver has got on the host vehicle M, the information processor 170 determines whether the door of the host vehicle M is closed (step S114).

When the door of the host vehicle M is closed, the autonomous parking controller 142 causes the stopped automated exit processing to restart (step S118), and proceeds to the processing of step S108. When a negative determination result is obtained in the processing of step S113 or S116, the procedure returns to the processing of step S110. As a result, processing of one routine of the present flowchart ends. Some of the processing of the present flowchart may be omitted and an order of each processing may be changed.

In the present flowchart, it is assumed that processing of determining whether the autonomous parking controller 142 has acquired a restart signal is omitted between step S114 and step S118, but the processing may be executed without being omitted. The autonomous parking controller 142 may determine whether a predetermined signal is output and causes the automated exit processing to restart when the predetermined signal is output between step S114 and step S118. The predetermined signal is a signal output by a predetermined operation performed on the HMI 30 in the vehicle compartment by the driver. In the processing of step S113, it may be determined whether a user different from the driver has got on the vehicle.

Figure 9:
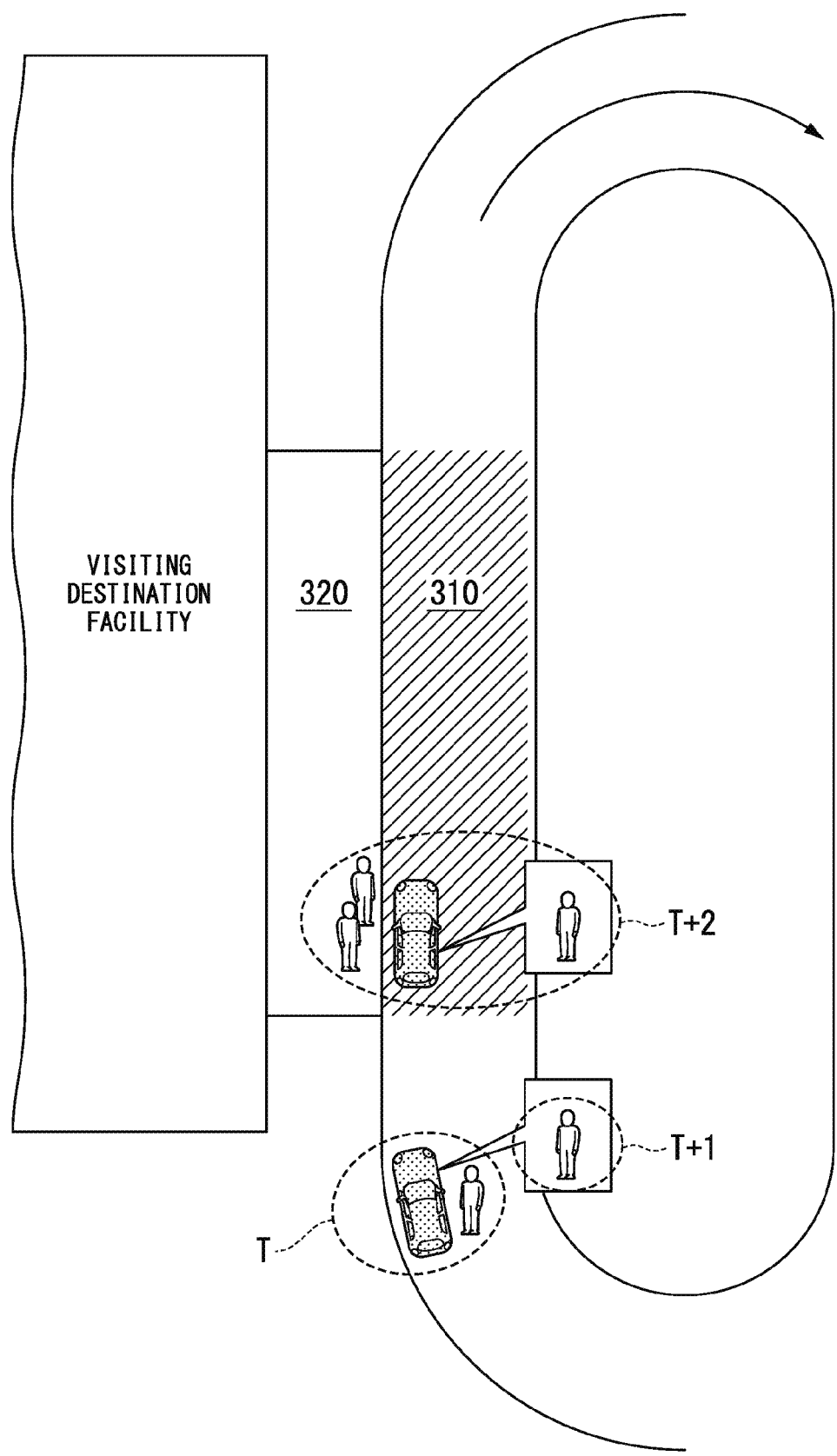
FIG. 9 is a diagram which shows another example of the scene in which an automated exit processing is restarted.

FIG. 9 is a diagram which shows another example of the scene in which an automated exit processing is restarted. The description of FIG. 9 is based on a premise that the automated exit processing is performed while the stop area 310 is congested in the same manner as FIG. 6, but illustration of another vehicle stopping in the getting-on/off area 320 will be omitted for simplification. For example, when the user has performed the specific operation at the time T, the automated exit processing is in the stopped state. If the driver gets on the host vehicle M at the time T+1, the host vehicle M restarts the automated exit processing after a predetermined time after the user gets on. That is, the host vehicle M starts traveling towards the getting-on/off area 320. The automated driving control device 100 stops at the stop area 310 of the getting-on/off area 320 due to the restarted automated exit processing at the time T+2. As a result, another user different from the driver can get on the host vehicle M in the getting-on/off area 320.

According to the second embodiment described above, the automated driving control device 100 maintains the stopped state of the automated exit processing even though a user different from the driver gets on the vehicle and the door of the host vehicle M is closed in the stopped state of the automated exit processing. The automated driving control device 100 causes the automated exit processing to restart when the driver gets on the host vehicle M and the door of the host vehicle M is closed in the stopped state of the automated exit processing. As a result, the driver or the user can get on the host vehicle M at a position associated with the type of user. As described above, the automated driving control device 100 can realize the behavior of the vehicle in accordance with the action of the user.

Third Embodiment

Hereinafter, a third embodiment will be described. In the second embodiment, the automated driving control device 100 determines whether the driver is in the vehicle on the basis of a result of detection by the seat sensor 48. In the third embodiment, the automated driving control device 100 determines whether the driver is in the vehicle on the basis of an image in which the user sitting on the driver's seat is captured. In the following description, a difference from the second embodiment will be mainly described.

Figure 10:
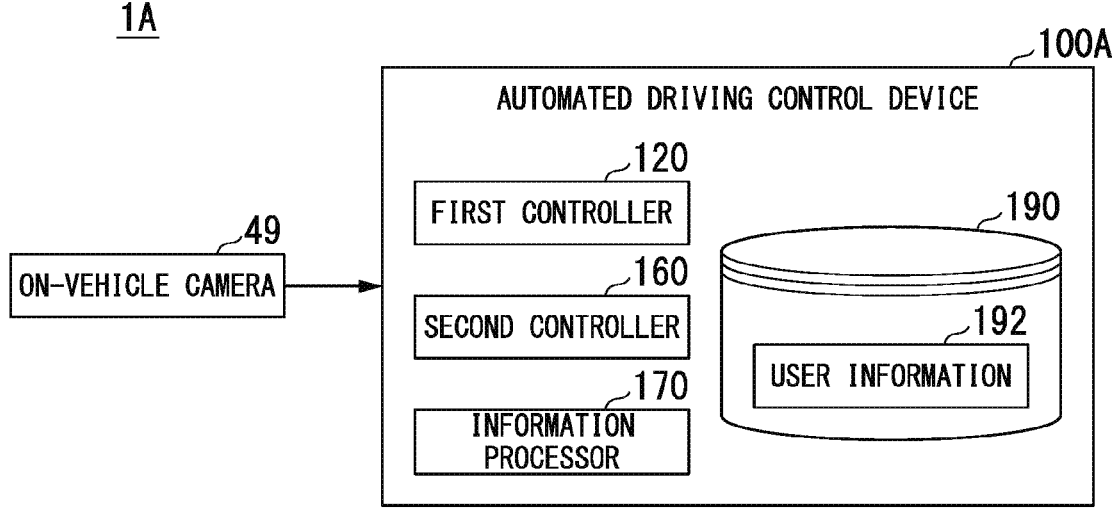
FIG. 10 is a diagram which shows an example of functional constituents centering on an automated driving control device of a third embodiment.

FIG. 10 is a diagram which shows an example of functional constituents centering on an automated driving control device 100A of the third embodiment. In FIG. 10, functional constituents other than the automated driving control device 100 shown in FIG. 1 of the first embodiment will be omitted. In the third embodiment, a vehicle system 1A includes an on-vehicle camera 49. In the third embodiment, for example, the seat sensor 48 will be omitted.

The on-vehicle camera 49 is, for example, a digital camera using a solid-state imaging device such as a CCD or a CMOS. The on-vehicle camera 49 is a camera for imaging a user sitting on the driver's seat or a user in a vehicle compartment. The on-vehicle camera 49 is attached to an arbitrary part at which the user sitting on the driver's seat or the user in the vehicle compartment can be imaged. The on-vehicle camera 49 images an interior of the vehicle compartment of the host vehicle M at a predetermined timing or in a periodically repeated manner. The on-vehicle camera 49 may also be a stereo camera.

The automated driving control device 100A further includes a storage 190 in addition to the functional constituents of the automated driving control device 100 of the first embodiment. The storage 190 stores user information 192. The user information 192 includes a feature amount extracted from an image in which an image of a driver set in advance is captured.

The boarding determiner 134 acquires an image acquired by the on-vehicle camera 49 (an image in which an image of the user sitting on the driver's seat is captured), and extracts a feature amount from the acquired image. The boarding determiner 134 determines whether a feature amount matching the extracted feature amount is included in the user information 192. When it is determined that the feature amount matching the extracted feature amount is included in the user information 192, the boarding determiner 134 determines that the driver has got on the host vehicle M.

According to the third embodiment described above, the same effects as in the second embodiment are achieved.

Fourth Embodiment

Hereinafter, a fourth embodiment will be described. In the fourth embodiment, the automated driving control device 100 controls the traveling drive force output device 200 or the steering device 220 without depending on an operation performed on a driving operator by the driver when a predetermined condition is not satisfied, and controls the traveling drive force output device 200 or the steering device 220 on the basis of an operation performed on the driving operator by the driver when the predetermined condition is satisfied.

The predetermined condition is, for example, that the brake pedal is operated to stop the host vehicle M at the stop area 310 of the getting-on/off area 320 or that the brake pedal is operated while the host vehicle M is stopped at the stop area 310 of the getting-on/off area 320. In the following description, a difference from the first embodiment is mainly described. When the traveling drive force output device 200, the brake device 210, and the steering device 220 are not distinguished, they may be simply referred to as "target devices."

Figure 11:
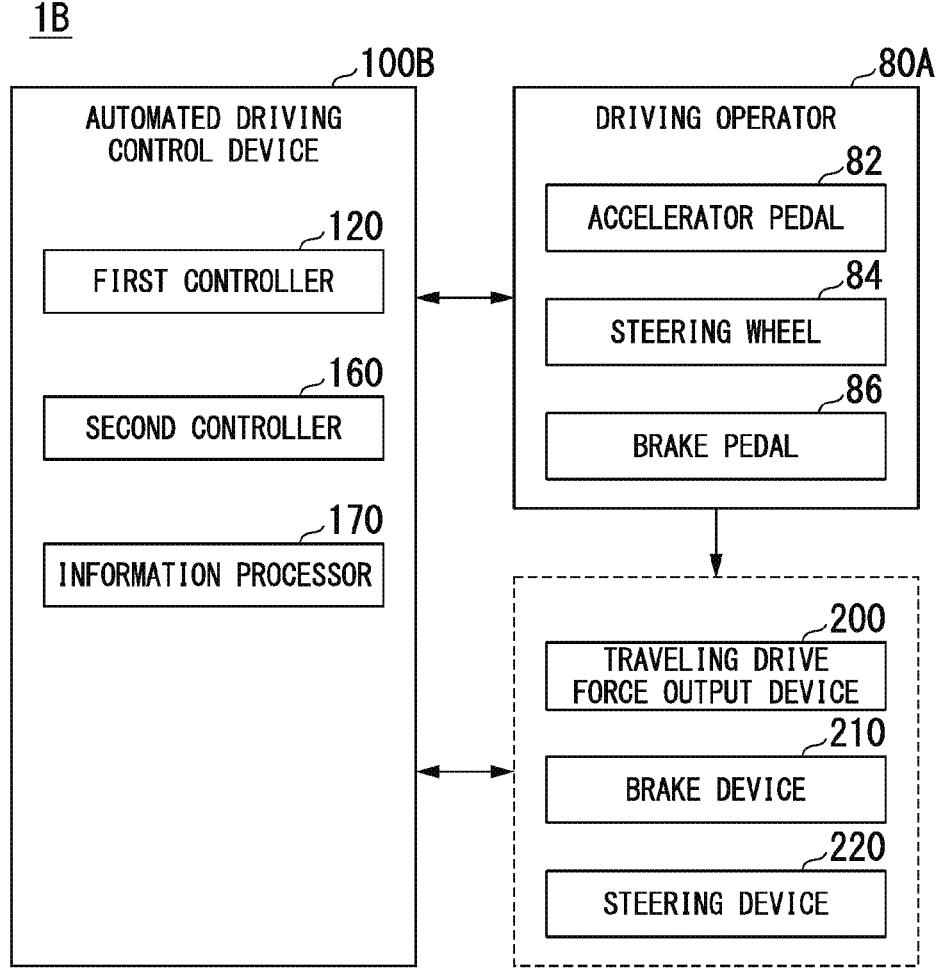
FIG. 11 is a diagram which shows a part of the functional constituents of a vehicle system of a fourth embodiment.

FIG. 11 is a diagram which shows some of the functional constituents of the vehicle system 1B of the fourth embodiment. In the example of FIG. 11, descriptions of constituents other than the automated driving control device 100, the traveling drive force output device 200, the brake device 210, and the steering device 220 will be omitted. The vehicle system 1B includes a driving operator 80A instead of the driving operator 80.

The driving operator 80A includes, for example, an accelerator pedal 82, a steering wheel 84, and a brake pedal 86. The accelerator pedal, the steering wheel, or the brake pedal is an example of the "first operator." The brake pedal 86 is an example of the "second operator."

Figure 12:
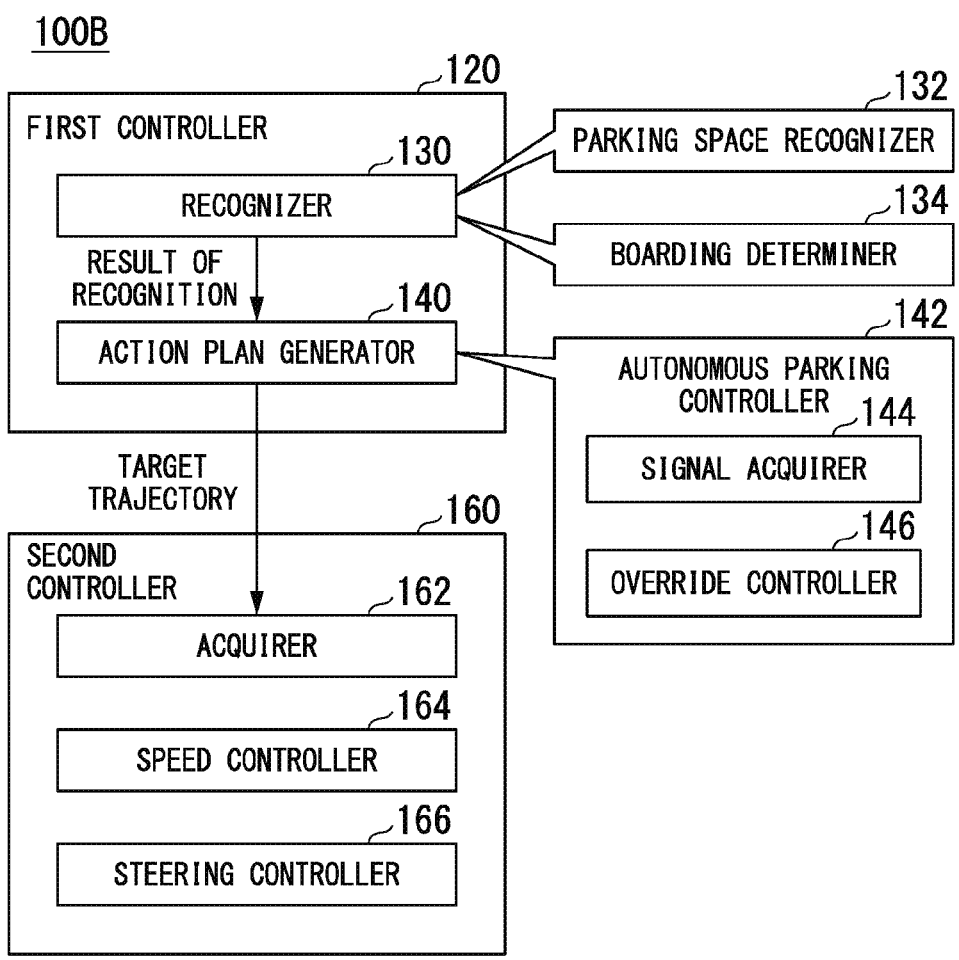
FIG. 12 is a diagram which shows functional constituents of a first controller of the fourth embodiment.

FIG. 12 is a diagram which shows functional constituents of the first controller 120 of the fourth embodiment. A difference from the first controller 120 of the first embodiment will be described. The autonomous parking controller 142 included in the first controller 120 of the fourth embodiment further includes an override controller 146 in addition to the signal acquirer 144.

The override controller 146 controls the brake device 210 according to information input on the basis of an operation of the brake pedal 86 regardless of whether the predetermined condition is satisfied when the automated exit processing is performed. The override controller 146 controls the brake device 210 according to the information input on the basis of the operation of the brake pedal 86 in the stop area 310 when the automated exit processing is performed.

When the automated exit processing is performed, the override controller 146 controls the target devices according to information input on the basis of an operation of the accelerator pedal 82 or the steering wheel 84 when the predetermined condition is satisfied.

When the automated exit processing is performed, the override controller 146 instructs the traveling drive force output device 200 and the steering device 220 to execute control based on information output to the second controller 160 when the predetermined condition is not satisfied. As a result, an operation received by the accelerator pedal 82 or the steering wheel 84 is not reflected in control of the traveling drive force output device 200 and the steering device 220.

[Flowchart]

Figure 13:
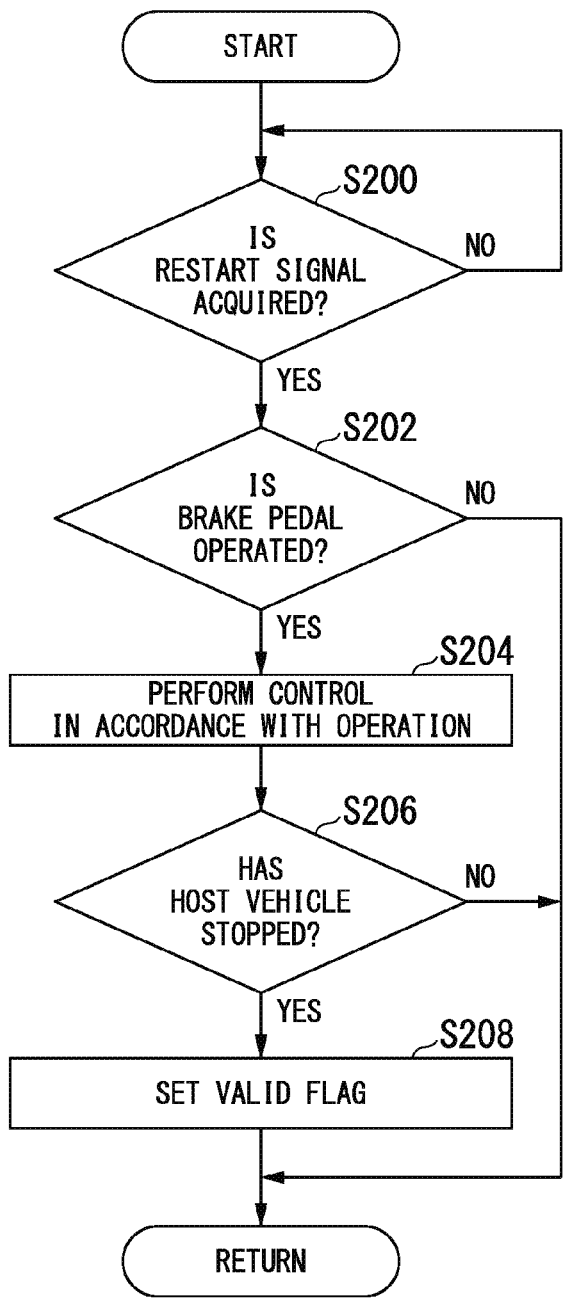
FIG. 13 is flowchart which shows an example of a flow of processing executed by the vehicle system.

FIG. 13 is a flowchart which shows an example of a flow of processing executed by the vehicle system 1B. The present processing is, for example, processing executed after the automated exit processing is stopped.

First, the autonomous parking controller 142 determines whether a restart signal has been acquired (step S200). When the restart signal has been acquired, the override controller 146 determines whether the brake pedal 86 has been operated (step S202). When the brake pedal 86 has not been operated, processing of one routine of the present flowchart ends.

When the brake pedal 86 is operated, the override controller 146 causes the brake device 210 to perform control in accordance with the operation of the brake pedal 86 (step S204). As a result, the brake device 210 controls a braking force on the basis of the operation of the brake pedal 86.

Next, the override controller 146 determines whether the host vehicle M has stopped on the basis of the operation of the brake pedal 86 (step S206). When the host vehicle M has not stopped, the processing of one routine of the present flowchart ends. When the host vehicle M has stopped, the override controller 146 sets a valid flag (step S208). As a result, the processing of one routine of the present flowchart ends.

Figure 14:
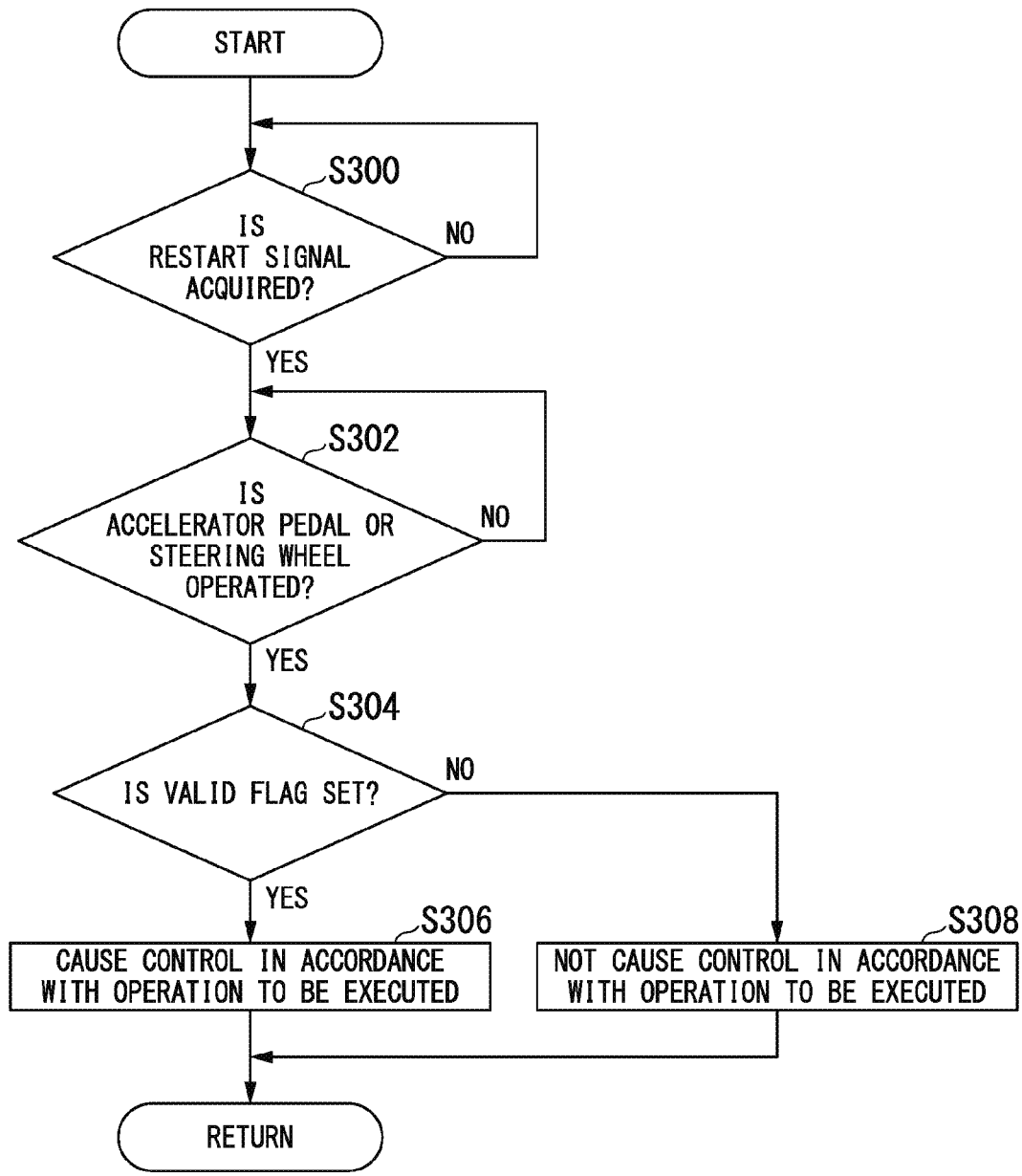
FIG. 14 is a flowchart which shows another example of the flow of processing executed by the vehicle system.

FIG. 14 is a flowchart which shows another example of the flow of processing executed by the vehicle system 1B. The present processing is, for example, processing executed after the automated exit processing is stopped.

First, the autonomous parking controller 142 determines whether a restart signal is acquired (step S300). When the restart signal is acquired, the override controller 146 determines whether the accelerator pedal 82, the steering wheel 84, or the brake pedal is operated (step S302). When the accelerator pedal 82, the steering wheel 84, or the brake pedal is operated, the override controller 146 determines whether the valid flag is set (step S304). The valid flag is processing set in the processing of step S208 of FIG. 13.

When the valid flag is set, the override controller 146 causes the traveling drive force output device 200, the steering device 220, or the brake device 210 to execute control in accordance with the operation on the accelerator pedal 82, the steering wheel 84, or the brake pedal (step S306). When the valid flag is not set, the override controller 146 does not cause the traveling drive force output device 200 or the steering device 220 to execute control in accordance with the operation on the accelerator pedal 82 or the steering wheel 84 (step S308). As a result, the processing of the present flowchart ends.

Figure 15:
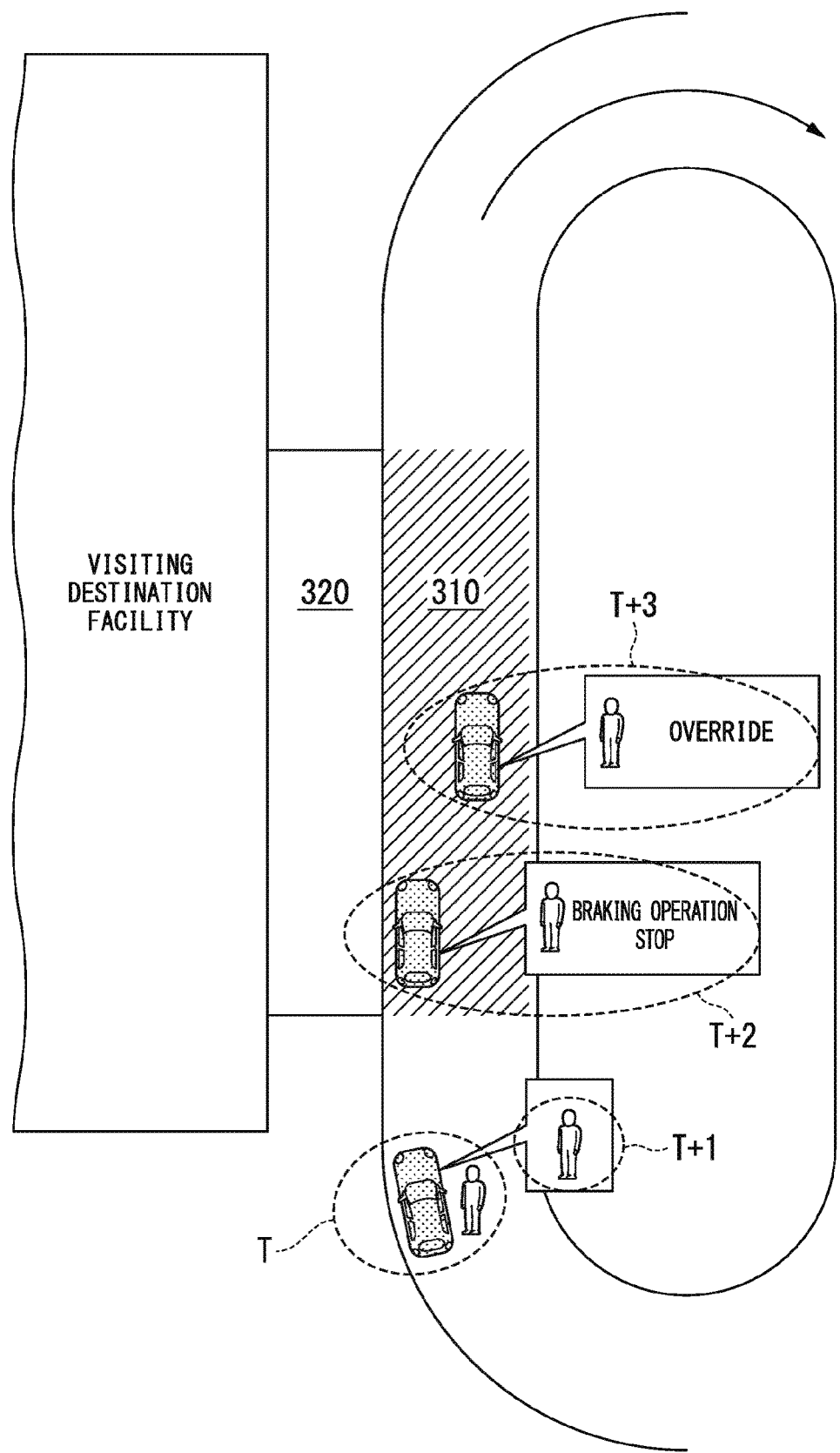
FIG. 15 is a diagram which shows another example of the scene in which automated exit processing is restarted.

FIG. 15 is a diagram which shows another example of the scene in which the automated exit processing is restarted. Description of FIG. 15 is performed on the premise that the stop area 310 of the getting-on/off area 320 is congested as in FIG. 6, but illustration of other vehicles which are stopped at the stop area 310 will be omitted for simplification. For example, when the user has performed a specific operation at a time T, the automated exit processing is in the stopped state. If the driver gets on the host vehicle M at a time T+1, the host vehicle M restarts the automated exit processing after a predetermined time since the driver has gotten on the host vehicle. That is, the host vehicle M starts traveling toward the getting-on/off area 320.

At a time T+2, the driver operates the brake pedal 86 and causes the host vehicle M to stop at the stop area 310. Thereafter, the override controller 146 causes the operation of the driver to be reflected in control of the target devices. As a result, the driver can operate the accelerator pedal 82 or the steering wheel 84 in addition to the operation on the brake pedal 86 to cause the host vehicle M to travel, as at a time T+3. That is, an override is executed.

According to the fourth embodiment described above, the automated driving control device 100 does not cause an operation performed on the accelerator pedal 82 or the steering wheel 84 to be reflected in the control of the host vehicle M after the automated exit processing is restarted. The automated driving control device 100 causes the operation performed on the accelerator pedal 82 or the steering wheel 84 to be reflected in the control of the host vehicle M after the host vehicle M has stopped on the basis of the operation performed on the brake pedal 86 at the stop area 310 or after the operation on the brake pedal 86 is performed while the host vehicle M is stopped at the stop area 310. As a result, it is possible to realize the behavior of the vehicle in accordance with the action of the user.

The first embodiment to fourth embodiment described above may be arbitrarily combined and performed.

[Hardware Configuration]

Figure 16:
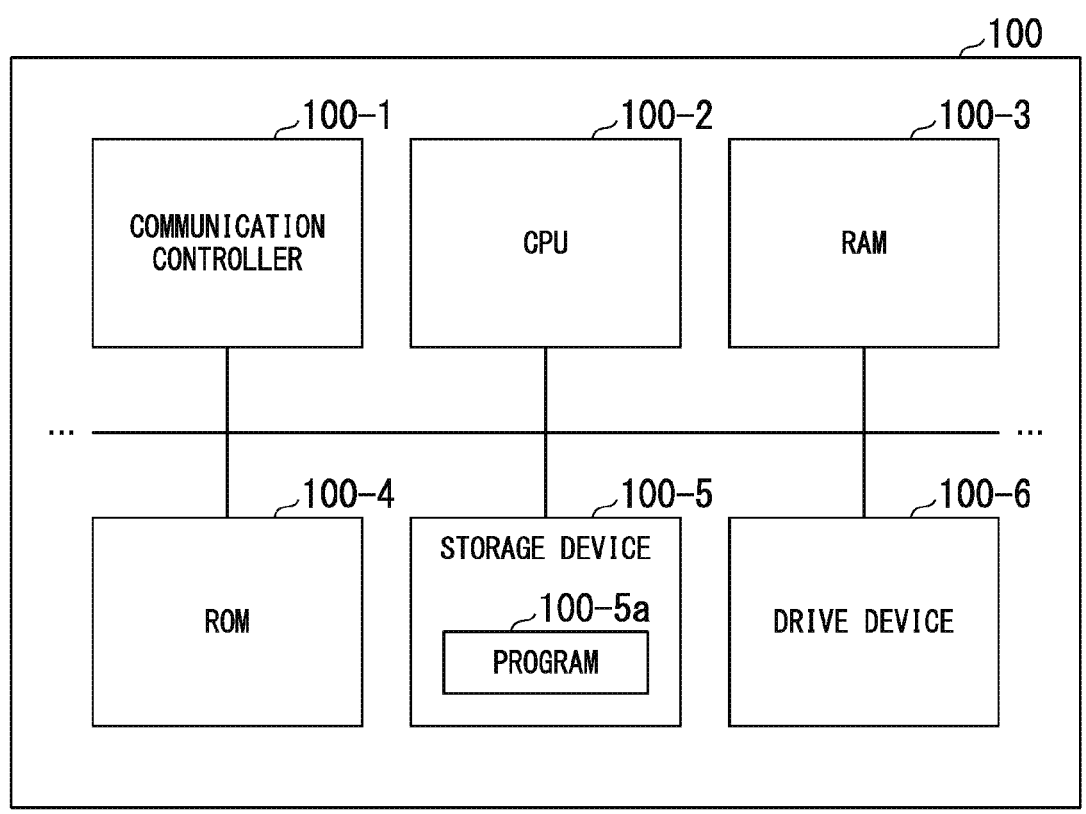
FIG. 16 is a diagram which shows an example of a hardware configuration of the automated driving control device of the embodiments.

FIG. 16 is a diagram which shows an example of a hardware configuration of the automated driving control device 100 of the embodiments. As shown in FIG. 16, the automated driving control device 100 is configured to include a communication controller 100-1, a CPU 100-2, a random access memory (RAM) 100-3 used as a working memory, a read only memory (ROM) 100-4 that stores a booting program and the like, a storage device 100-5 such as a flash memory or a hard disk drive (HDD), a drive device 100-6, and the like being connected to one another by an internal bus or a dedicated communication line. The communication controller 100-1 communicates with components other than the automated driving control device 100. The storage device 100-5 stores a program 100-5a executed by the CPU 100-2. This program is expanded in the RAM 100-3 by a direct memory access (DMA) controller (not shown) or the like and executed by the CPU 100-2. As a result, some or all of the first controller 120, the second controller 160, and the information processor 170 are realized.

The embodiments described above can be expressed as follows.

A vehicle control device is configured to include a storage device in which a program is stored, and a hardware processor, to detect a specific operation performed on a vehicle from outside the vehicle, to control steering and acceleration or deceleration of the vehicle on the basis of the recognized vicinity situation, and to bring the vehicle into a stopped state when the specific operation is detected by the detector before the vehicle arrives at a boarding area in automated exit processing, the boarding area being area in which a user of the vehicle is allowed to get on the vehicle, the automated exit processing being process in which the vehicle is caused to exit from a parking lot and allowing the user to get on the vehicle in the boarding area.

As described above, the forms for implementing the present invention have been described using the embodiments. However, the present invention is not limited to such embodiments, and various modifications and substitutions may be added in a range not departing from the gist of the present invention.

What is claimed is:

1. A vehicle control device comprising:
   a detector configured to detect a specific operation performed on a vehicle from an outside of the vehicle;
   a vicinity situation recognizer configured to recognize a vicinity situation of the vehicle; and
   a driving controller configured to control steering, and acceleration or deceleration of the vehicle on the basis of the vicinity situation recognized by the vicinity situation recognizer,
   wherein, the driving controller is configured to execute an automated exit processing, the automated exit processing being a process in which the vehicle is caused to exit from a parking lot and allowing a user to get on the vehicle in the boarding area,
   if the specific operation is detected by the detector before the vehicle arrives at a boarding area in automated exit processing, the driving controller is configured to bring the vehicle into a stopped state, the specific operation is an operation in which the user who does not get in the vehicle touches an outside of the vehicle, the boarding area being an area in which the user of the vehicle is allowed to get on the vehicle.

2. The vehicle control device according to claim 1, wherein, when the specific operation is detected by the detector, the driving controller is configured to bring the automated exit processing into the stopped state.

3. The vehicle control device according to claim 1, wherein the specific operation is an operation of opening a door of the vehicle or an operation of unlocking a door lock of the door accompanied by contact of the user to the door of the vehicle.

4. The vehicle control device according to claim 1, wherein, even when the vicinity situation recognizer is configured to recognize that the user has performed a gesture to cause the vehicle to stop in an area before arriving at the boarding area, the driving controller is configured to bring the vehicle into the stopped state.

5. The vehicle control device according to claim 1, further comprising:
   an acquirer configured to acquire a restart signal for causing traveling of the vehicle to restart from a terminal device held by the user,
   wherein the detector is configured to detect that the user has got on the vehicle, and the driving controller is configured to cause traveling of the vehicle to restart when the acquirer acquires the restart signal after the detector does not detect that the user has got on the vehicle in a stopped state of the vehicle.

6. The vehicle control device according to claim 1, further comprising:
a boarding determiner configured to determine whether a driver or a user different from the driver has got on the vehicle,
wherein the detector is configured to detect an open or closed state of a door of the vehicle, and
the driving controller is configured to maintain a stopped state of the vehicle even after the detector detects that the door of the vehicle has been closed when the boarding determiner determines that the user different from the driver has got on the vehicle in the stopped state of the vehicle.

7. The vehicle control device according to claim 1, further comprising:
a boarding determiner configured to determine whether a driver has got on the vehicle,
wherein the detector is configured to detect an open or closed state of a door of the vehicle, and
the driving controller is configured to cause traveling of the vehicle to restart when the boarding determiner determines that the driver has got on the vehicle and the detector detects that the door of the vehicle is closed.

8. The vehicle control device according to claim 7, further comprising:
a first operator that is an accelerator pedal, a steering wheel, or a brake pedal; and
a controller configured to control the vehicle on the basis of an operation performed on the first operator,
wherein the controller is configured to not cause the operation performed on the first operator to be reflected in the control of the vehicle after the traveling of the vehicle is restarted.

9. The vehicle control device according to claim 8, further comprising:
a first operator that is an accelerator pedal or a steering wheel;
a second operator that is a brake pedal; and
a controller configured to control the vehicle on the basis of an operation performed on the first operator or a second operator,
wherein the controller is configured to cause the operation performed on the first operator to be reflected in the control of the vehicle after the vehicle has stopped on the basis of an operation performed on the second operator in the boarding area or after an operation is performed on the second operator while the vehicle is stopped in the boarding area.

10. The vehicle control device according to claim 1,
wherein the driving controller is configured to bring the automated exit processing into a completed state when the detector detects the specific operation after the vehicle has entered the boarding area in the automated exit processing.

11. The vehicle control device according to claim 10,
wherein the driving controller is configured to not cause the automated exit processing to restart when a request for automated exit processing is acquired after the automated exit processing is brought into the completed state, and is configured to cause the automated exit processing to restart when the request for the automated exit processing is acquired after a request for automated entrance processing for causing the vehicle to enter a parking lot after the automated exit processing is brought into the completed state.

12. A vehicle control method comprising:
by a computer,
detecting a specific operation performed on a vehicle from outside the vehicle;
recognizing a vicinity situation of the vehicle;
controlling steering and acceleration or deceleration of the vehicle on the basis of the recognized vicinity situation; and
executing an automated exit processing, the automated exit processing being process in which the vehicle is caused to exit from a parking lot and allowing a user to get on the vehicle in the boarding area,
if the specific operation is detected before the vehicle arrives at a boarding area in automated exit processing, bringing the vehicle into a stopped state, the specific operation is an operation in which the user who does not get in the vehicle touches an outside of the vehicle, the boarding area being area in which the user of the vehicle is allowed to get on the vehicle.

13. A non-transitory computer-readable storage medium that stores a computer program to be executed by a computer to perform at least:
detect a specific operation performed on a vehicle from outside the vehicle;
recognize a vicinity situation of the vehicle;
control steering and acceleration or deceleration of the vehicle on the basis of the recognized vicinity situation; and
executing an automated exit processing, the automated exit processing being process in which the vehicle is caused to exit from a parking lot and allowing a user to get on the vehicle in the boarding area,
if the specific operation is detected before the vehicle arrives at a boarding area in automated exit processing, bringing the vehicle into a stopped state, the specific operation is an operation in which the user who does not get in the vehicle touches an outside of the vehicle, the boarding area being area in which the user of the vehicle is allowed to get on the vehicle.

14. The vehicle control device according to claim 1,
the specific operation is an operation in which the user who does not get in the vehicle touches a door on the outside the vehicle.

15. The vehicle control device according to claim 1,
in a case in which the vehicle is into the stopped state by stopping automated exit processing, a driver has got on the vehicle, and a door of the vehicle is closed, the driving controller restarts the stopped automated exit processing and cause the vehicle to travel,
in a case in which the vehicle is into the stopped state by stopping automated exit processing, a driver has not got on the vehicle, and a door of the vehicle is closed, the driving controller does not restart the stopped automated exit processing and does not cause the vehicle to travel.

16. The vehicle control device according to claim 1,
in a case in which the vehicle is into the stopped state by stopping automated exit processing and a driver has got on the vehicle, the driving controller restarts the stopped automated exit processing and cause the vehicle to travel to the boarding area;
when a predetermined condition is satisfied during traveling, the driving controller controls the vehicle according to an operation of a brake pedal or an accelerator pedal by the driver, when the predetermined condition is not satisfied during traveling, the driving controller controls the vehicle without depending on the operation of the brake pedal or the accelerator pedal by the driver, the predetermined condition is that vehicle enter the boarding area and the driver operates the brake pedal.

\* \* \* \* \*